United States Patent
Bakewell (10) Patent No.: US 9,631,881 B2
(45) Date of Patent: Apr. 25, 2017

(54) CONDITIONAL SYSTEM OF CLIMATE CONTROL

(71) Applicant: John J. Bakewell, Carlisle, MA (US)

(72) Inventor: John J. Bakewell, Carlisle, MA (US)

( * ) Notice: Subject to any disclaimer, the term of this patent is extended or adjusted under 35 U.S.C. 154(b) by 728 days.

(21) Appl. No.: 14/027,106

(22) Filed: Sep. 13, 2013

(65) Prior Publication Data

US 2015/0075765 A1    Mar. 19, 2015

(51) Int. Cl.
| | | |
|---|---|---|
| *G05D 23/00* | (2006.01) | |
| *F28F 27/00* | (2006.01) | |
| *F24F 3/06* | (2006.01) | |
| *F28D 20/00* | (2006.01) | |
| *F24D 11/00* | (2006.01) | |
| *F24D 19/10* | (2006.01) | |
| *G05D 23/19* | (2006.01) | |

(52) U.S. Cl.
CPC ............ *F28F 27/00* (2013.01); *F24D 11/003* (2013.01); *F24D 11/004* (2013.01); *F24D 19/1024* (2013.01); *F24D 19/1033* (2013.01); *F24F 3/06* (2013.01); *F28D 20/0034* (2013.01); *G05D 23/1924* (2013.01); *F24D 2200/04* (2013.01); *F24D 2200/14* (2013.01); *F24D 2220/042* (2013.01); *Y02B 10/20* (2013.01); *Y02B 10/70* (2013.01); *Y02E 60/142* (2013.01)

(58) Field of Classification Search
CPC .. F28F 27/00; G05D 23/1924; F24D 19/1024; F24D 11/003; F24D 11/004; F24D 19/1033; F28D 20/0034; F24F 3/06; Y02B 10/20; Y02B 10/70; Y02E 60/142

USPC ............ 165/287, 289, 10, 45, 48.1, 48.2, 50
See application file for complete search history.

(56) References Cited

U.S. PATENT DOCUMENTS

| | | | | |
|---|---|---|---|---|
| 7,130,719 | B2 * | 10/2006 | Ehlers ................. | F24F 11/0012 700/276 |
| 8,108,076 | B2 * | 1/2012 | Imes ...................... | H04L 67/42 340/686.6 |
| 8,386,087 | B2 * | 2/2013 | Spicer ...................... | H02J 3/14 700/22 |
| 8,386,197 | B1 * | 2/2013 | Plaisted .................. | H02S 50/10 702/58 |
| 9,043,163 | B2 * | 5/2015 | Mezic .................... | G05B 15/02 702/24 |
| 2002/0043068 | A1 * | 4/2002 | Carr ..................... | F24F 5/0017 62/3.7 |
| 2002/0117166 | A1 * | 8/2002 | Okumura ................ | F24D 5/005 126/633 |
| 2002/0152298 | A1 * | 10/2002 | Kikta ................... | H04L 12/2803 709/223 |
| 2006/0214014 | A1 * | 9/2006 | Bash .................... | F24F 11/0012 236/1 B |
| 2009/0038668 | A1 * | 2/2009 | Plaisted ............. | H01L 31/0521 136/244 |

(Continued)

*Primary Examiner* — Len Tran
*Assistant Examiner* — Claire Rojohn, III
(74) *Attorney, Agent, or Firm* — Clark S. Bakewell (57) ABSTRACT

A conditional climate control system is presented for maximizing the comfort level of the climate within a building while minimizing the usage of an on-demand energy source. An energy reserve created by an intermittent energy source or sources is monitored, and when it has surpassed a predetermined threshold level the climate conditions of a building are set to more desirable but energy intensive levels from energy-saving levels.

7 Claims, 5 Drawing Sheets

(56) References Cited

U.S. PATENT DOCUMENTS

| | | | |
|---|---|---|---|
| 2010/0217642 A1* | 8/2010 | Crubtree | G06Q 10/00 705/7.12 |
| 2010/0245103 A1* | 9/2010 | Plaisted | F24D 11/003 340/657 |
| 2010/0332373 A1* | 12/2010 | Crabtree | G06Q 50/06 705/37 |
| 2011/0040666 A1* | 2/2011 | Crabtree | G06Q 30/0283 705/37 |
| 2011/0106328 A1* | 5/2011 | Zhou | G05B 13/024 700/291 |
| 2011/0113360 A1* | 5/2011 | Johnson | H04L 12/2825 715/771 |
| 2011/0202467 A1* | 8/2011 | Hilber | G06Q 50/188 705/80 |
| 2011/0238223 A1* | 9/2011 | Narayanamurthy | F24F 5/0046 700/277 |
| 2011/0257795 A1* | 10/2011 | Narayanamurthy | F24F 5/0046 700/277 |
| 2012/0109395 A1* | 5/2012 | Finch | G06Q 50/06 700/295 |
| 2013/0074827 A1* | 3/2013 | Kim | F24D 3/08 126/641 |
| 2013/0085614 A1* | 4/2013 | Wenzel | F24F 11/006 700/277 |
| 2013/0085616 A1* | 4/2013 | Wenzel | G05F 1/66 700/278 |
| 2013/0110295 A1* | 5/2013 | Zheng | G05B 13/02 700/286 |
| 2013/0226359 A1* | 8/2013 | Ji | G06Q 50/06 700/291 |
| 2013/0245847 A1* | 9/2013 | Steven | G06Q 50/06 700/291 |
| 2013/0261808 A1* | 10/2013 | Besore | F24F 11/0015 700/278 |
| 2013/0345880 A1* | 12/2013 | Asmus | G05D 23/1917 700/276 |
| 2013/0346139 A1* | 12/2013 | Steven | G06Q 10/06314 705/7.24 |

* cited by examiner

CONDITIONAL SYSTEM OF CLIMATE CONTROL

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The invention relates to controlling the climate of a building. Specifically, the invention is directed at buildings that use an intermittent energy source, such as a solar panel, as well as an on-demand energy source, such as a furnace, to regulate the climate of a building.

BACKGROUND OF THE INVENTION

There is an increasing use of small-scale alternative energy sources to supplement traditional energy sources to fulfill power consumption demands, which can often include controlling the climate of a building. Two general types of energy sources will be discussed in this specification: intermittent and on-demand. An intermittent energy source is an energy source that is activated and deactivated by the occurrence of events that are not controlled by the system; examples include wind turbines or solar panels, as their productivity is determined by the wind and sun respectively. An on-demand energy source is an energy source that can be activated at will, such as a fossil fuel furnace or an electrical heater. In general, intermittent energy sources are forms of renewable energy and thus are desirable for reasons of being cheaper and more environmentally friendly for a building manager to use. For the purposes of this specification, a building manager is anyone who has control over the climate settings of a building, whether it is residential or commercial.

Regarding climate control systems where the intermittent energy source assists with heating, in colder months with high heating requirements, the intermittent energy source may only be expected to reduce the consumption of on-demand energy sources to meet heating needs. In these conditions, a building manager might set the climate of a room to parameters which provide only adequate comfort in order to minimize on-demand energy usage. Conversely, during warmer months with low heating requirements, the intermittent energy source may provide capacity far in excess of heating needs, eliminating the need for on-demand energy. In these conditions, a building manager would be expected to set climate parameters to those that are optimal without fear of using the on demand energy source.

Alternatively, for climate control systems where the intermittent energy source assists with cooling, in warmer months with high cooling requirements, the intermittent energy source may only be expected to reduce the consumption of on-demand energy sources to meet cooling needs. In these conditions, a building manager might set the climate of a room to parameters which provide only adequate comfort in order to minimize on-demand energy usage. Conversely, during colder months with low cooling requirements, the intermittent energy source may provide capacity far in excess of cooling needs, eliminating the need for on-demand energy. In these conditions, a building manager would be expected to set climate parameters to those that are optimal without fear of using the on demand energy source.

However, in many cases, there exists a difference between optimal climate conditions and those that are set to use a minimal amount of on-demand energy. In certain environmental conditions likely to occur during "shoulder" seasons between colder and warmer months, the energy reserve created by the intermittent energy source may occasionally surpass conditions where it would otherwise need to be supplemented by the on-demand energy source to meet the building's climate needs, while the climate controls remain set to energy-saving levels. An attentive building manager could harness this otherwise wasted energy by raising or lowering the temperature limit of the thermostat(s) in the building to take advantage of this opportunity for greater comfort and to get ahead of the heating demand, but unless he remained vigilant, he would run the risk of using the on-demand energy source when the reserve energy from the intermittent source dissipates. This invention allows the building manager to allocate surplus thermal energy throughout the building only as available without needing to manually change the temperature settings which determine when the on-demand energy source is used.

Prior art teaches systems that use both intermittent and on-demand energy sources to regulate the climate of a building, as exemplified by U.S. Pat. No. 8,041,461. However, while the prior art is directed to efficient use of intermittent energy sources, it does not teach multiple levels of climate temperatures according to reserve energy levels, but rather assumes fixed climate parameters.

Prior art that teaches conditional energy management does not do so in a way that would be instructive to a building manager wishing to minimize the use of on-demand energy sources while maximizing the comfort level of the climate within a building. Examples of this prior art include US 2003/0009265 A1 and US 2012/0086273 A1. This prior art is directed at reducing the peak load to a larger electrical grid, as a way of minimizing the amount of equipment, and therefore expense, required to handle peak electrical loads. As such, it does not address the situation of a building that has access to both an intermittent energy reserve and an on-demand energy source controlled by a building manager who wishes to selectively limit the usage of on-demand energy while maximizing the comfort level of the climate within a building, with no care to peak load. Alone or in combination, the prior art would not teach the changing of climate parameters in response to an established energy reserve from an intermittent source.

Thus, there is exists a need within the art to allow a building manager to set more desired climate conditions only during times when doing so would not increase usage of an on-demand energy source. The conditional climate control system disclosed herein attempts to fill that need and maximize system performance while reducing the expense and environmental impact incurred by a building manager.

SUMMARY OF THE INVENTION

With these factors in mind, a system is disclosed to balance capital expense and energy savings with optimal climate conditions for systems which use both intermittent and on-demand energy sources to regulate the climate of a building.

Specifically, the invention is a system that controls the climate of a desired area or areas by providing energy from a combination of sources, both intermittent and on-demand.

The intermittent energy is stored within the system prior to use in an energy reserve, the energy level of which is monitored by the system. Separately, a thermostat, or series of thermostats, measures the climate temperature of the building being regulated. As with a conventional heating or cooling system, when the temperature of the building is too low or too high as measured by a thermometer and compared to a setpoint temperature, depending on whether the system is directed towards heating or cooling, the system uses available energy sources to heat or cool the building. These energy sources can be on-demand, intermittent, or a combination of both, depending on their availability as determined by the system.

However, when the system senses that there is a surplus of intermittent energy stored in the energy reserve, such that the heating or cooling system is at least able to run entirely on that reserve, the temperature setpoint of the thermometer switches to a more comfortable temperature as determined by the building manager. This setpoint will be at a higher temperature if the system is directed to heating, and a lower temperature if the system is directed towards cooling. The building manager may also direct this surplus energy condition to be at a quantity of energy above the minimum required to run the system entirely on energy generated by the intermittent source out of desire to continue to have a reserve of intermittent energy. This transition of the temperature setpoints in response to determined energy conditions of the energy reserve is central to the invention, and allows a climate control system to be created that changes the heating or cooling conditions within a building in response to the availability of stored intermittent energy.

Various embodiments are presented of the invention that use a variety of energy sources, types of intermittent energy reserves, and climate parameters, but all show the invented system conditionally managing climate parameters in response to the status of the intermittent energy reserve.

BRIEF DESCRIPTION OF THE DRAWINGS

The invention disclosed may be more fully understood with the aid of the following drawings together with the detailed description of the drawings. The drawings serve to demonstrate one or more preferred embodiments of the invention and are not to be construed as limiting the scope of the invention. In the drawings.

DETAILED DESCRIPTION OF THE DRAWINGS

The present invention is intended to be implemented in conjunction with systems known to the art that use a combination of intermittent and on-demand energy sources to control the climate of a building.

Figure 1:
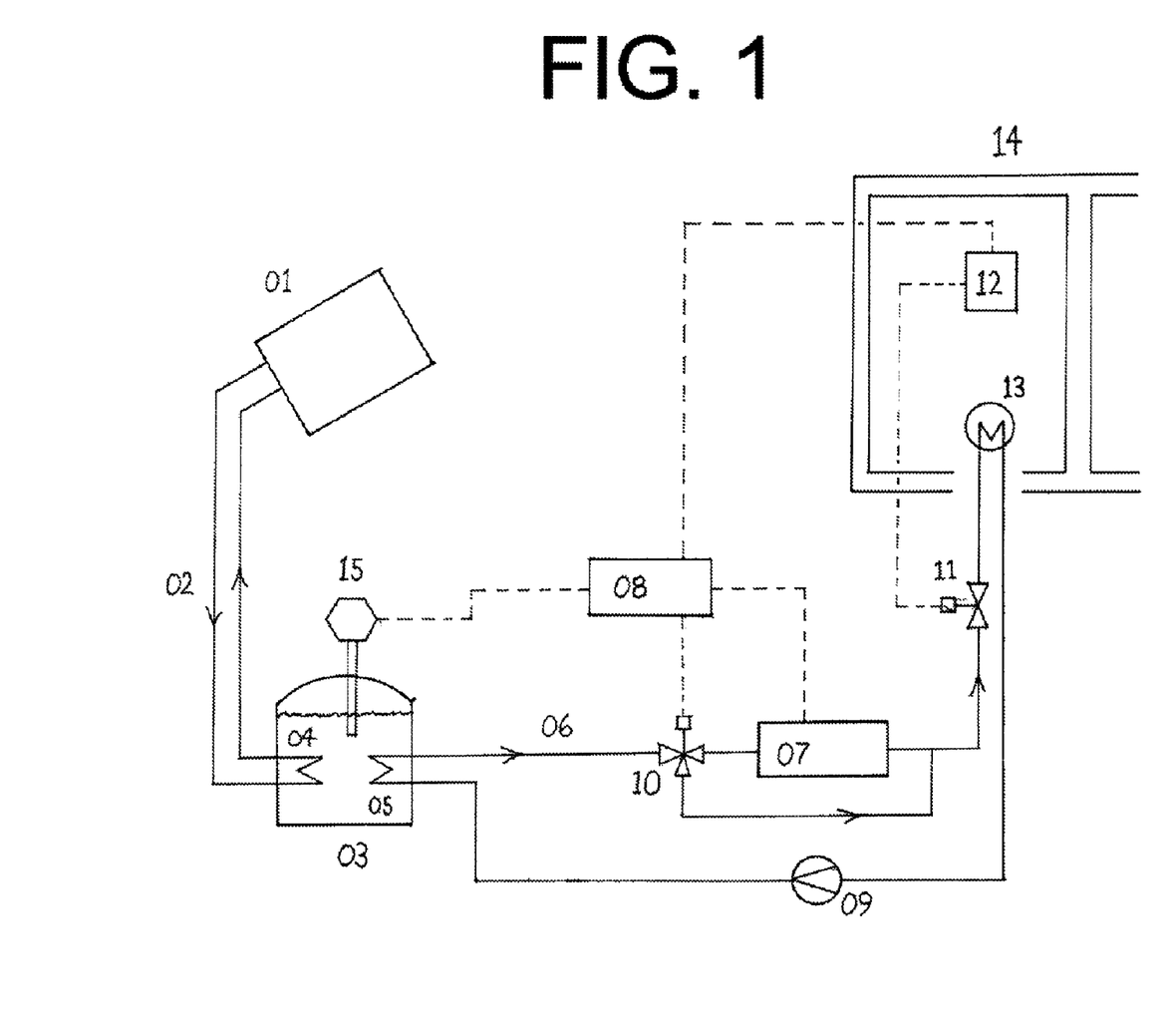
FIG. 1 illustrates a basic system diagram according to one embodiment of the invention.

Referring to FIG. 1, an intermittent energy generator, shown here as thermal solar panel 01, absorbs solar energy and transfers that energy via thermal conductor, shown here as pipes of heated fluid 02, to the thermal energy reserve 03 by means of a heat transfer coil 04. The thermal energy reserve 03 is shown here as a large insulated water tank, but it is recognized that alternative thermal reserve systems are known to the art and could be substituted.

From the thermal energy reserve 03, a hydronic heating system comprising a heat transfer coil 05, pipes of heated fluid 06, a boiler 07, a boiler controller 08, a pump 09, and solenoid 10 is shown to distribute the thermal energy to the building via a heated fluid, although it is recognized that alternative heat distribution systems are known to the art and could be substituted without undue experimentation. In the hydronic heating system, the heat transfer coil 05 heats the fluid within the system which is circulated by means of a pump 09 to solenoid 10. At solenoid 10, the boiler controller 08 determines if the fluid is of sufficient temperature to bypass additional heating, a mechanism that is well known to the art. If the fluid is not of sufficient temperature to bypass the on-demand heating source, shown here as a boiler 07, it is heated by that on-demand heating source.

The heated fluid then travels from the boiler or bypass to solenoid valve 11, which is controlled by conditional thermostat 12. A conditional thermostat is any thermostat that can be programmed to have different setpoint temperatures depending on the status of the intermittent energy reserve. When the conditional thermostat 12 determines that the conditions for heating are met, the solenoid valve 11 is opened to allow the heated fluid to flow to the heat exchanger 13 within a room in the building 14. The heat exchanger may be radiant floor pipes, a radiator, or any other substitutes known to the art. From this heat exchanger 13, the fluid continues through the hydronic heating system loop, through pump 09, and returns to the heat transfer coil 05 to regain thermal energy, and the process is repeated.

The logic by which the conditional thermostat 12 determines the conditions for opening the solenoid valve 11 is a core principal within the invention. Because thermal energy is transferred both into the thermal energy reserve 03 by means of the heat transfer coil 04 and out of the thermal energy reserve 03 by means of the heat transfer coil 05, the temperature of the reserve [$T_{Reserve}$] will accordingly rise and fall as a result of the difference of energy transferred into and out of the reserve 03. This change in temperature is monitored by the thermal energy reserve temperature sensor 15, which sends the information to the conditional thermostat 12, a process shown in this embodiment as passing through the boiler controller 08.

Conditional thermostat 12 determines the relationship of $T_{Reserve}$ to a predetermined threshold temperature [$T_{Threshold}$], which should be set by the building manager to be equal to or greater than the temperature that the thermal energy reserve 03 needs to reach to no longer require the operation of the on-demand heating source. Thus, it follows that when $T_{Reserve}$ is greater than or equal to $T_{Threshold}$, the on-demand heating source will not be used to heat the room in the building 14, and there can then reasonably be considered to be surplus energy in the reserve for purposes of heating the building. It should be noted that while the logic is shown here as occurring in conditional thermostat 12, the physical location and device of the computations described may be changed without substantially altering the invented system.

In such instances of surplus energy, the building temperature [$T_{Room}$] below which the conditional thermostat 12 instructs the solenoid 11 to open (known as a setpoint temperature) changes from an energy-saving low temperature [$T_{Conserve}$] to a more comfortable and higher temperature [$T_{Surplus}$]. That is to say, when $T_{Reserve}$ is less than $T_{Threshold}$, the hydronic heating system is only operational when $T_{Room}$ is less than $T_{Conserve}$, whereas when $T_{Reserve}$ is greater than or equal to $T_{Threshold}$, the hydronic heating system is operational when $T_{Room}$ is less than $T_{Surplus}$.

TABLE 1

| Condition | Reserve Temperature | Building Temperature | Heat |
|---|---|---|---|
| 1 | $T_{Reserve} < T_{Threshold}$ | $T_{Room} < T_{Conserve}$ | On |
| 2 | $T_{Reserve} < T_{Threshold}$ | $T_{Room} \geq T_{Conserve}$ | Off |
| 3 | $T_{Reserve} \geq T_{Threshold}$ | $T_{Room} < T_{Conserve}$ | On |
| 4 | $T_{Reserve} \geq T_{Threshold}$ | $T_{Conserve} \leq T_{Room} < T_{Surplus}$ | On |
| 5 | $T_{Reserve} \geq T_{Threshold}$ | $T_{Room} \geq T_{Surplus}$ | Off |

Table 1 is a table that explicitly shows the logic used by the conditional thermostat 12. Recall that $T_{Conserve}$ is necessarily set to be a lesser temperature than $T_{Surplus}$. In a hydronic heating system, a heat condition of "On" means that the solenoid valve 11 will be open.

In this embodiment, condition 4 shows the benefit of the invention. In condition 4, although the building temperature is above the conservative temperature point, the building is further heated until either it reaches the surplus temperature point or the condition of the temperature reserve changes. This is in contrast to conventional climate control system, where at any given time the thermostat has a single temperature condition to determine the status of the heating system. Thus, in specific instances of surplus energy in the reserve, the building is automatically heated to a more comfortable temperature.

Figure 2:
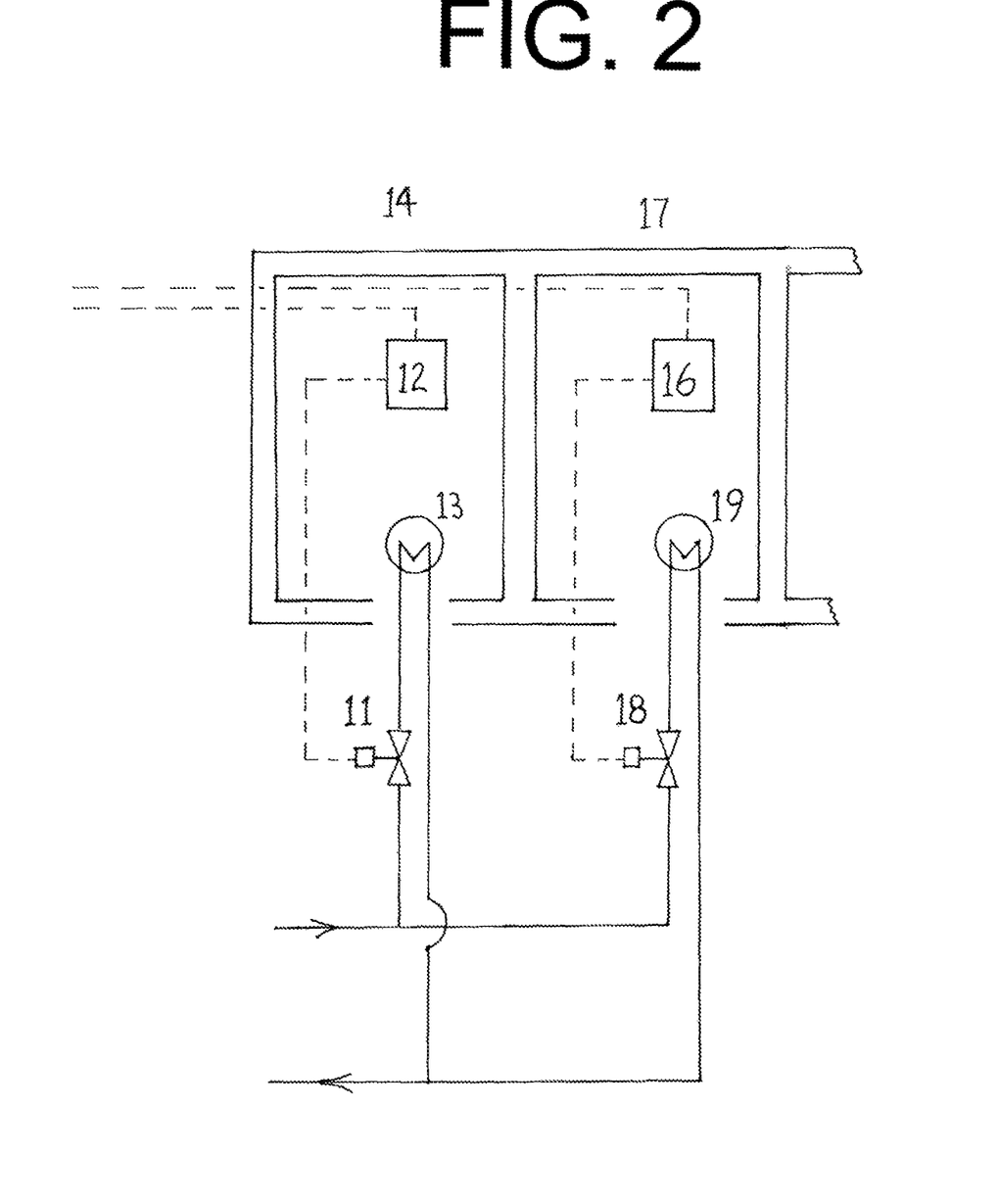
FIG. 2 illustrates the way the invention may be used to prioritize rooms within a building.

FIG. 2 demonstrates the way that the invention can be used to prioritize multiple rooms within a building. This in an embodiment of the invention which uses two coordinated sets of energy reserve conditions to show how one room, Room 1, may be prioritized over another room, Room 2, for purposes of climate control. Because FIG. 2 is intended to be a derivative embodiment of the system as shown by FIG. 1, and only modifying a part of the full system, it should be understood that the entire system is not shown for reasons of redundancy and that components of the system that are not displayed are assumed to be equivalent to those in FIG. 1. Although FIG. 2 shows only two rooms prioritized, it should be understood that any number of rooms may be similarly prioritized in this manner by creating multiple levels of limited surplus conditions, as will be subsequently explained.

The thermal energy reserve temperature sensor 15 from FIG. 1 in this embodiment is monitored by both the conditional thermostat 12 in the original room 14 in the building and the conditional thermostat 16 in a second room 17. Conditional thermostat 12 determines the relationship of $T_{Reserve}$ to a predetermined threshold temperature [$T_{Threshold1}$], which should be set to be equal to or greater than the temperature that the thermal energy reserve 03 needs to reach to no longer require the operation of the on-demand heating source for the purposes of heating Room 1 14. Conditional thermostat 16 determines the relationship of $T_{Reserve}$ to a predetermined threshold temperature [$T_{Threshold2}$], which should be set to be greater than $T_{Threshold1}$ by several degrees of temperature, and also greater than or equal to the temperature that the thermal energy reserve 03 needs to reach to no longer require the operation of the on-demand heating source for the purposes of heating Room 2 16. This is to ensure that any thermal energy surplus in the thermal energy reserve 03 will first be transferred to the prioritized Room 1 14.

Thus, it follows that when $T_{Reserve}$ is greater than or equal to $T_{Threshold1}$ but less than $T_{Threshold2}$, the on-demand heating source would not be used to heat Room 1 14, and there can reasonably be considered to be surplus energy in the reserve only for purposes of heating Room 1 14. When $T_{Reserve}$ is greater than or equal to $T_{Threshold2}$, the on-demand heating source would not be used to heat either Room 1 14 or Room 2 17, and there can reasonably be considered to be surplus energy in the reserve for purposes of heating both rooms. Instances when there is only surplus energy for Room 1 14 but not Room 2 17 will be referred to as limited surplus energy conditions, whereas instances when there is surplus energy for both Room 1 14 and Room 2 17 will be referred to as full surplus energy conditions.

In instances of both limited surplus energy and full surplus energy, the temperature of Room 1 [$T_{Room1}$] below which the conditional thermostat 12 instructs the solenoid 11 to open changes from an energy-saving low temperature [$T_{Conserve1}$] to a more comfortable and higher temperature [$T_{Surplus1}$]. When solenoid 11 is open, heated fluid is allowed to flow to the heat exchanger 13 within Room 1 14. From this heat exchanger 13, the fluid continues within the hydronic heating system loop and returns to the heat transfer coil 05 to regain thermal energy.

In instances of full surplus energy, the temperature of Room 2 [$T_{Room2}$] below which the conditional thermostat 16 instructs the solenoid 18 to open changes from an energy-saving low temperature [$T_{Conserve2}$] to a more comfortable and higher temperature [$T_{Surplus2}$]. When solenoid 18 is open, heated fluid is allowed to flow to the heat exchanger 19 within Room 1 17. From this heat exchanger 19, the fluid continues within the hydronic heating system loop and returns to the heat transfer coil 05 to regain thermal energy, along with the returning fluid from Room 1 14 which also flows under conditions of full surplus energy.

TABLE 2

| Condition | Reserve Temperature | Room 1 Temperature | Room 2 Temperature | Heat Room 1 | Heat Room 2 |
|---|---|---|---|---|---|
| 1 | $T_{Reserve} < T_{Threshold1}$ | $T_{Room1} < T_{Conserve1}$ | $T_{Room2} < T_{Conserve2}$ | On | On |
| 2 | $T_{Reserve} < T_{Threshold1}$ | $T_{Room1} < T_{Conserve1}$ | $T_{Room2} \geq T_{Conserve2}$ | On | Off |
| 3 | $T_{Reserve} < T_{Threshold1}$ | $T_{Room1} \geq T_{Conserve1}$ | $T_{Room2} < T_{Conserve2}$ | Off | On |
| 4 | $T_{Reserve} < T_{Threshold1}$ | $T_{Room1} \geq T_{Conserve1}$ | $T_{Room2} \geq T_{Conserve2}$ | Off | Off |
| 5 | $T_{Threshold1} \leq T_{Reserve} < T_{Threshold2}$ | $T_{Room1} < T_{Conserve1}$ | $T_{Room2} < T_{Conserve2}$ | On | On |
| 6 | $T_{Threshold1} \leq T_{Reserve} < T_{Threshold2}$ | $T_{Room1} < T_{Conserve1}$ | $T_{Room2} \geq T_{Conserve2}$ | On | Off |
| 7 | $T_{Threshold1} \leq T_{Reserve} < T_{Threshold2}$ | $T_{Conserve1} \leq T_{Room1} < T_{Surplus1}$ | $T_{Room2} < T_{Conserve2}$ | On | On |
| 8 | $T_{Threshold1} \leq T_{Reserve} < T_{Threshold2}$ | $T_{Conserve1} \leq T_{Room1} < T_{Surplus1}$ | $T_{Room2} \geq T_{Conserve2}$ | On | Off |
| 9 | $T_{Threshold1} \leq T_{Reserve} < T_{Threshold2}$ | $T_{Room1} \geq T_{Surplus1}$ | $T_{Room2} < T_{Conserve2}$ | Off | On |
| 10 | $T_{Threshold1} \leq T_{Reserve} < T_{Threshold2}$ | $T_{Room1} \geq T_{Surplus1}$ | $T_{Room2} \geq T_{Conserve2}$ | Off | Off |
| 11 | $T_{Reserve} \geq T_{Threshold2}$ | $T_{Room1} < T_{Conserve1}$ | $T_{Room2} < T_{Conserve2}$ | On | On |

TABLE 2-continued

| Condition | Reserve Temperature | Room 1 Temperature | Room 2 Temperature | Heat Room 1 | Heat Room 2 |
|---|---|---|---|---|---|
| 12 | $T_{Reserve} \geq T_{Threshold2}$ | $T_{Room1} < T_{Conserve1}$ | $T_{Conserve2} \leq T_{Room2} < T_{Surplus2}$ | On | On |
| 13 | $T_{Reserve} \geq T_{Threshold2}$ | $T_{Room1} < T_{Conserve1}$ | $T_{Room2} \geq T_{Surplus2}$ | On | Off |
| 14 | $T_{Reserve} \geq T_{Threshold2}$ | $T_{Conserve1} \leq T_{Room1} < T_{Surplus1}$ | $T_{Room2} < T_{Conserve2}$ | On | On |
| 15 | $T_{Reserve} \geq T_{Threshold2}$ | $T_{Conserve1} \leq T_{Room1} < T_{Surplus1}$ | $T_{Conserve2} \leq T_{Room2} < T_{Surplus2}$ | On | On |
| 16 | $T_{Reserve} \geq T_{Threshold2}$ | $T_{Conserve1} \leq T_{Room1} < T_{Surplus1}$ | $T_{Room2} \geq T_{Surplus2}$ | On | Off |
| 17 | $T_{Reserve} \geq T_{Threshold2}$ | $T_{Room1} \geq T_{Surplus1}$ | $T_{Room2} < T_{Conserve2}$ | Off | On |
| 18 | $T_{Reserve} \geq T_{Threshold2}$ | $T_{Room1} \geq T_{Surplus1}$ | $T_{Conserve2} \leq T_{Room2} < T_{Surplus2}$ | Off | On |
| 19 | $T_{Reserve} \geq T_{Threshold2}$ | $T_{Room1} \geq T_{Surplus1}$ | $T_{Room2} \geq T_{Surplus2}$ | Off | Off |

Table 2 is a table that explicitly shows the logic used by the conditional thermostats 12 and 16. Recall that $T_{Threshold1}$ is set below $T_{Threshold2}$ to prioritize Room 1 14 over Room 2 17. Moreover, $T_{Conserve1}$ necessarily set to a lesser temperature than $T_{Surplus1}$, and $T_{Conserve2}$ is necessarily set to a lesser temperature than $T_{Surplus2}$. In a hydronic heating system, a heat condition of "On" for Room 1 means that the solenoid valve 11 will be open, and a heat condition of "On" for Room 2 means that the solenoid valve 18 will be open.

In this embodiment, condition 8 shows the benefit of the invention being implemented to prioritize rooms. In condition 8, although both Room 1 14 and Room 2 17 have temperatures that are at or above their respective conservative temperatures, only Room 1 is further heated until it reaches its surplus temperature. Thus, Room 1 is prioritized above Room 2 in instances of limited surplus energy reserves. Again, it should be noted that this embodiment merely demonstrates two rooms each using the invented system with independent temperature levels, and shows multiple iterations of the invented system used in combination. By using additional temperature levels, increasing numbers of rooms could be prioritized by the building manager.

Figure 3:
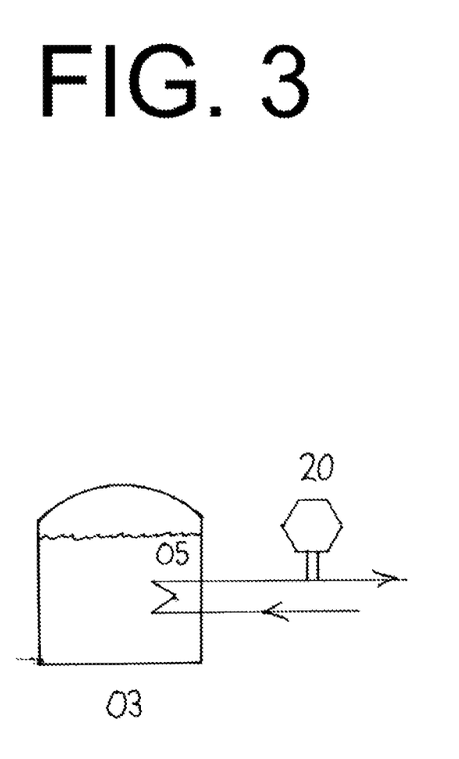
FIG. 3 illustrates a variation of the system of FIG. 1, where an alternative measurement is used to determine surplus energy conditions.

FIG. 3 demonstrates an alternative method of measuring the thermal energy of the thermal energy reserve 03 and shows a change made to the system of FIG. 1. A temperature sensor 20 monitors the temperature of the heating fluid [$T_{Fluid}$] exiting the heat transfer coil 05 within the thermal energy reserve 03 from the embodiment shown by FIG. 1. The information from temperature sensor 20 is relayed to the conditional thermostat 12. Because the exiting temperature of the heating fluid will correspond to the temperature of the thermal energy reserve 03, a measurement of $T_{Fluid}$ made by the temperature sensor 20 can be considered a measurement of the energy reserve of the intermittent power source, analogous to that made by temperature sensor 15 from FIG. 1. Therefore, in this embodiment, $T_{Fluid}$ is substituted for $T_{Reserve}$ in the logic of the conditional thermostat 12 (as explicitly shown by Table 1), and otherwise the operation of the system as shown by FIG. 1 remains the same.

Figure 4:
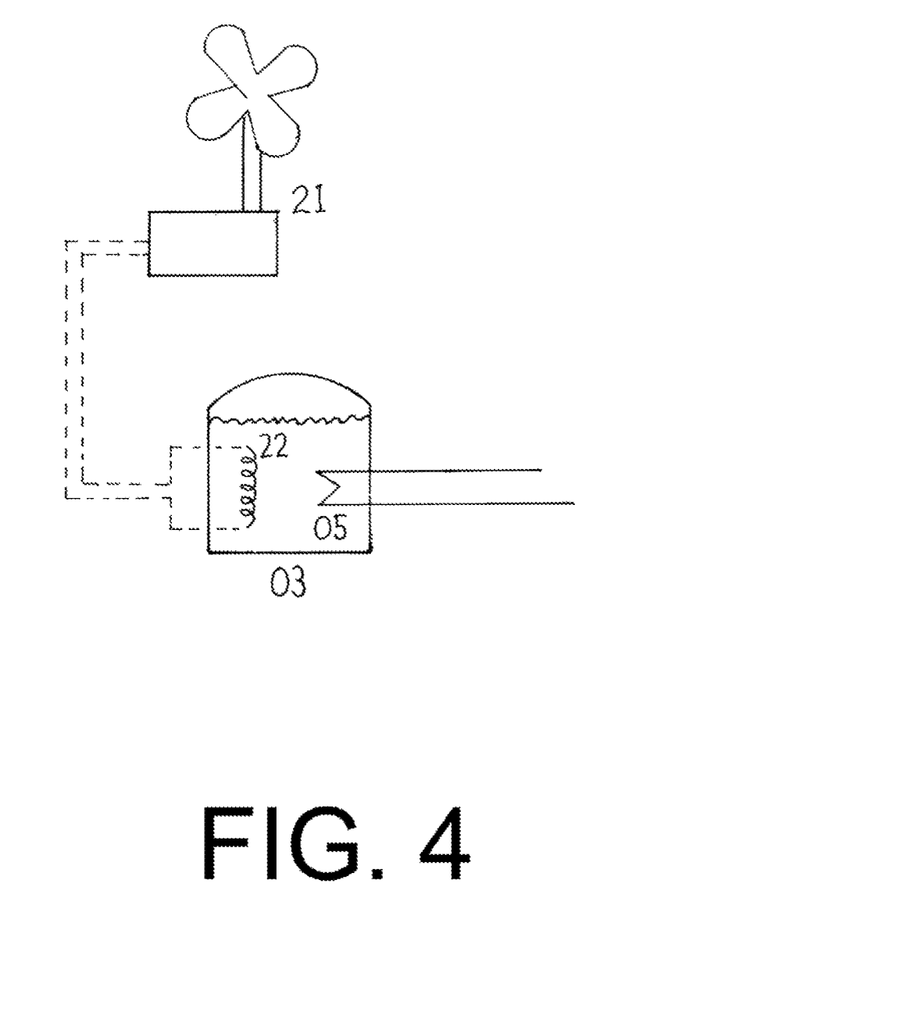
FIG. 4 illustrates an alternative embodiment of the invention using a different form of intermittent energy.

FIG. 4 demonstrates an alternative system using a different form of intermittent energy generator, in this case a wind turbine 21. Electrical current generated by the wind turbine 21 is sent through a resistor 22 within the thermal energy reserve 03 of FIG. 1. Fluid is heated by means of heat transfer coil 05, and the rest of the system operates as in FIG. 1. The purpose of this figure is to demonstrate that alternative intermittent energy sources are compatible with the invention without undue modification.

Figure 5:
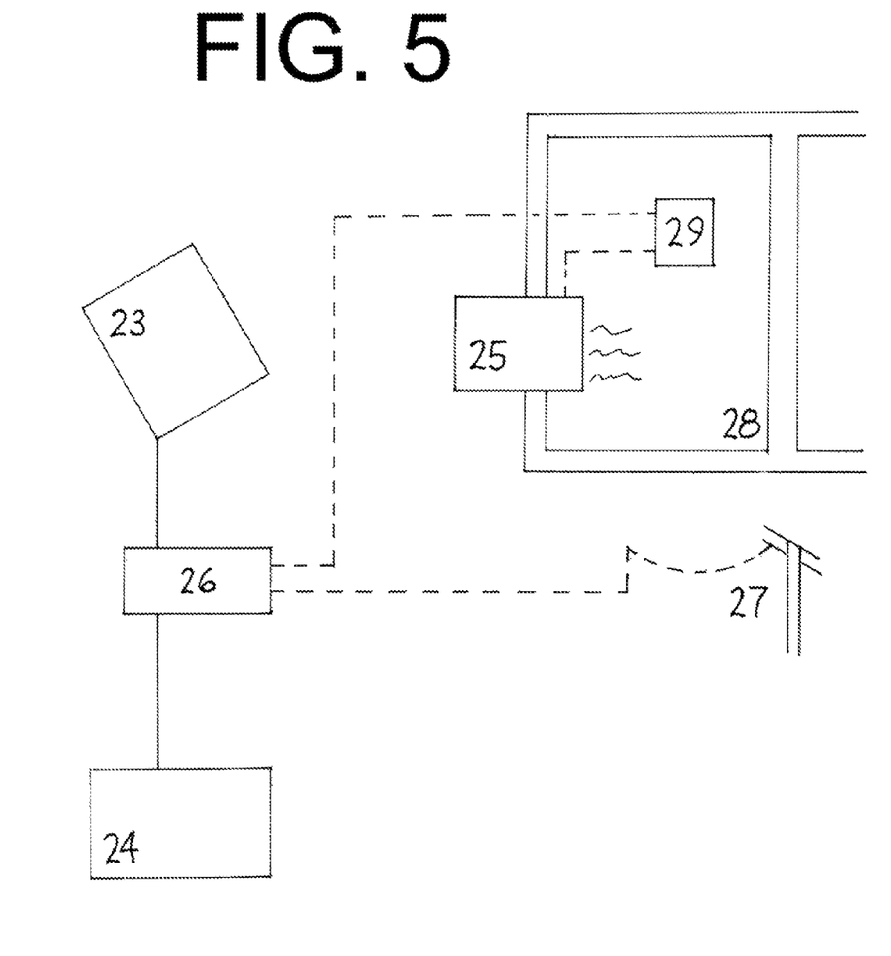
FIG. 5 illustrates an alternative embodiment of the invention that is directed towards cooling the climate of a building.

FIG. 5 demonstrates a configuration by which the invention may be applied to a climate control system that cools rather than heats. Component 23 is a photovoltaic solar panel that generates an electrical current that charges a battery array 24.

When air conditioner 25 is operational, it draws electrical power through the combined charge controller and power manager 26, which in turn draws electrical power from the battery array 24 if available and sufficient or from the on-demand electrical power supply, shown here as the power grid 27, if not. Air conditioner 25 cools the climate of room 28.

The combined charge controller and power manager 26, a device known within the art, charges the battery array 24 with energy supplied by the photovoltaic solar panel 23 whenever the both the battery array 24 is below a full charge and energy is available from the photovoltaic solar panel 23. When the electrical potential energy of battery array 24 [$U_{Battery}$] is above a predetermined threshold value [$U_{Threshold}$] set by the building manager to be greater than or equal to the electrical capacity needed to fully supply the air conditioner 25, the system will not need to draw power from the on-demand electrical power supply, and thus can be determined to be in a state of surplus energy.

In such instances of surplus energy, the building temperature [$T_{Room}$] above which the conditional thermostat 29 instructs air conditioner 25 to operate changes from an energy-saving higher temperature [$T_{Conserve}$] to a more comfortable and lower temperature [$T_{Surplus}$]. That is to say, when $U_{Battery}$ is less than $U_{Threshold}$, the air conditioner 25 is only operational when $T_{Room}$ is greater than $T_{Conserve}$. However, when $U_{Battery}$ is equal to or greater than $U_{Threshold}$, the air conditioner 25 is operational when $T_{Room}$ is greater than $T_{Surplus}$. This logic should readily be appreciated as being analogous to the logic employed by conditional thermostat 12 of FIG. 1, albeit for a system that cools rather than heats.

TABLE 3

| Condition | Electrical Potential Energy Level | Building Temperature | Air Conditioning |
|---|---|---|---|
| 1 | $U_{Battery} < U_{Threshold}$ | $T_{Room} > T_{Conserve}$ | On |
| 2 | $U_{Battery} < U_{Threshold}$ | $T_{Room} \leq T_{Conserve}$ | Off |
| 3 | $U_{Battery} \geq U_{Threshold}$ | $T_{Room} > T_{Conserve}$ | On |
| 4 | $U_{Battery} \geq U_{Threshold}$ | $T_{Conserve} \geq T_{Room} > T_{Surplus}$ | On |
| 5 | $U_{Battery} \geq U_{Threshold}$ | $T_{Room} \leq T_{Surplus}$ | Off |

Table 3 is a table that explicitly shows the logic used by the conditional thermostat 29. Recall that $T_{Conserve}$ is necessarily set to be a higher temperature than $T_{Surplus}$.

In this embodiment, condition 4 shows the benefit of the invention. In condition 4, although the building temperature is below the conservative temperature point, the building is further cooled until either it reaches the surplus temperature point or the condition of the temperature reserve changes. This is in contrast to conventional climate control system, where at any given time the thermostat has a single temperature condition to determine the status of the cooling system. Thus, in instances of surplus energy in the reserve, the building is cooled to a more comfortable temperature.

Of course, because the core invention is directed towards implementing a system that manages the reserve energy from an intermittent energy source to control the climate of a building, the fact that the system depicted in FIG. 5 cools a building (whereas the systems of FIGS. 1, 3, 5, and 6 are shown to heat a building) does not disqualify it from including variations as previously disclosed. Because of this, the prioritization of rooms as shown by FIG. 2 should also be apparent with a system that cools, as long as the threshold energy reserve conditions used by conditional thermostats directed towards cooling are appropriately and analogously staggered.

It should be noted that the thermostats as described by this specification are assumed to use conventional methods to detect temperature well known to the art. However, the exact manner by which thermostats detect the temperature should be considered immaterial to the implementation of this invention. Most thermostats switch on at temperatures either above or below the setpoint temperature, depending if their function is within a heating or cooling system, and such thermostats form the basis of this specification. However, it is known that some thermostats combine both heating and cooling systems and are thus triggered to correct either high or low temperatures. In such a manner, the use of a single thermostat that separately controls both a heating system as described by this specification and an independent cooling system as described by this specification would not constitute a new invention but rather a logical implementation of the present one.

Although this specification provides the best known methods of implementing the invention, it is understood that numerous insubstantial changes in configuration, arrangement, or appearance of the elements of the present invention can be made without departing from the intended scope of the present invention. Specifically, although the best mode of the invention is presented here as using solar energy, it is understood that wind, tidal, geothermal, and hydro power, among others, are all renewable energy sources that could be implemented as the intermittent energy sources described herein without undue experimentation. Moreover, multiple energy storage systems exist besides thermal and electrical-potential, such as storage of mechanical potential energy in springs or elevated weights. Usage of such alternative intermittent energy sources or storage systems would not affect the core of the invention. Accordingly, it is intended that the scope of the present invention be determined by the claims as set forth.

The invention claimed is:

1. A climate control system, comprising: a location to be heated to at least a minimum required temperature, an intermittent energy source, the energy from which is stored in an energy reserve, wherein the energy reserve has an energy level, an on-demand energy source which is used to supplement the intermittent energy source as necessary to meet climate demands of the location, a hydronic heating system powered by the energy reserve and the on-demand energy source, wherein the hydronic heating system heats the location to be heated, a monitor that measures the energy level of the energy reserve, a conditional thermostat located in the location to be heated, wherein the conditional thermostat has at least a lower and a higher temperature setpoint, wherein, when the energy level of the energy reserve is below a user-determined energy level, the minimum required temperature of the location to be heated is equal to the lower temperature setpoint, and when the energy level of the energy reserve exceeds the user-determined energy level, the minimum required temperature of the location to be heated is equal to the higher temperature setpoint, further comprising: a second location to be heated to at least a second required minimum temperature, a second conditional thermostat located in the second location to be heated, wherein the second conditional thermostat has at least a second lower and a second higher temperature setpoint, wherein the hydronic heating system further heats the second location to be heated, wherein, when the energy level of the energy reserve is below a second user-determined energy level, the second minimum required temperature of the second location to be heated is equal to the second lower temperature setpoint, and when the energy level of the energy reserve exceeds the second user-determined energy level, the second minimum required temperature of the second location to be heated is equal to the second higher temperature setpoint, and wherein the second user-determined energy level corresponds to a higher energy level than the user-determined energy level.

2. The climate control system of claim 1, wherein the energy reserve is a battery, and the monitor measures electrical potential.

3. A climate control system, comprising: a location to be cooled to at least a maximum required temperature, an intermittent energy source, the energy from which is stored in an energy reserve, wherein the energy reserve has an energy level, an on-demand energy source which is used to supplement the intermittent energy source as necessary to meet climate demands of the location, an air conditioner, wherein the air conditioner cools the location to be cooled, a monitor that measures the energy level of the energy reserve, a conditional thermostat located in the location to be cooled, wherein the conditional thermostat has at least a lower and a higher temperature setpoint, wherein, when the energy level of the energy reserve is below a user-determined energy level, the maximum required temperature of the location to be cooled is equal to the higher temperature setpoint, and when the energy level of the energy reserve exceeds the user-determined energy level, the maximum required temperature of the location to be heated is equal to the lower temperature setpoint, further comprising: a second location to be cooled to at least a second required maximum temperature, a second conditional thermostat located in the second location to be cooled, wherein the second conditional thermostat has at least a second lower and a second higher temperature setpoint, wherein the second location to be cooled is cooled by the air conditioner or a second air conditioner, wherein, when the energy level of the energy reserve is below a second user-determined energy level, the second maximum required temperature of the second location to be cooled is equal to the second higher temperature setpoint, and when the energy level of the energy reserve exceeds the second user-determined energy level, the second maximum required temperature of the second location to be cooled is equal to the second lower temperature setpoint, and wherein the second user-determined energy level corresponds to a higher energy level than the user-determined energy level.

4. The climate control system of claim 3, wherein the energy reserve is a battery, and the monitor measures electrical potential.

5. The climate control system of claim 3, further comprising:
   a second location to be cooled to at least a second required maximum temperature,
   a second conditional thermostat located in the second location to be cooled, wherein the second conditional thermostat has at least a second lower and a second higher temperature setpoint, wherein the second location to be cooled is cooled by the air conditioner or a second air conditioner, wherein, when the energy level of the energy reserve is below a second user-determined energy level, the second maximum required temperature of the second location to be cooled is equal to the second higher temperature setpoint, and when the energy level of the energy reserve exceeds the second user-determined energy level, the second maximum required temperature of the second location to be cooled is equal to the second lower temperature setpoint, and wherein the second user-determined energy level corresponds to a higher energy level than the user-determined energy level.

6. The climate control system of claim 1, wherein the intermittent energy source is a solar energy panel.

7. The climate control system of claim 3, wherein the intermittent energy source is a solar energy panel.

* * * * *